United States Patent
Fan et al.

(10) Patent No.: US 9,123,111 B2
(45) Date of Patent: Sep. 1, 2015

(54) METHODS AND SYSTEMS FOR DETECTING PATCH PANEL PORTS FROM AN IMAGE IN WHICH SOME PORTS ARE OBSCURED

(71) Applicant: Xerox Corporation, Norwalk, CT (US)

(72) Inventors: Zhigang Fan, Webster, NY (US); Subarna Ghosh, Williamsville, NY (US); Hengzhou Ding, San Diego, CA (US)

(73) Assignee: Xerox Corporation, Norwalk, CT (US)

( * ) Notice: Subject to any disclaimer, the term of this patent is extended or adjusted under 35 U.S.C. 154(b) by 219 days.

(21) Appl. No.: 13/968,016

(22) Filed: Aug. 15, 2013

(65) Prior Publication Data
US 2015/0049903 A1  Feb. 19, 2015

(51) Int. Cl.
*G06K 9/00* (2006.01)
*G06T 7/00* (2006.01)

(52) U.S. Cl.
CPC ................... *G06T 7/0042* (2013.01)

(58) Field of Classification Search
CPC .. G06T 7/0042; Y02B 60/43; H04L 41/0213; H04L 41/12; H04L 41/0806; H04L 41/22; H04L 43/0811; G06N 5/02
See application file for complete search history.

(56) References Cited

U.S. PATENT DOCUMENTS

| | | | |
|---|---|---|---|
| 5,335,035 A | 8/1994 | Maeda | |
| 5,487,666 A | 1/1996 | DiGiovanni | |
| 5,541,708 A * | 7/1996 | Tsuruoka | 399/60 |
| 6,542,625 B1 | 4/2003 | Lee et al. | |
| 7,479,982 B2 | 1/2009 | Otani et al. | |
| 7,554,575 B2 | 6/2009 | Zandifar et al. | |
| 7,750,966 B2 | 7/2010 | Horie | |
| 7,978,845 B2 | 7/2011 | Caveney et al. | |
| 8,306,935 B2 | 11/2012 | Doorhy et al. | |
| 8,331,752 B2 | 12/2012 | Biribuze et al. | |
| 8,345,938 B2 | 1/2013 | Yoshida | |
| 8,499,109 B2 | 7/2013 | Nakama | |
| 8,643,476 B2 * | 2/2014 | Pinn et al. | 340/10.6 |
| 2003/0007077 A1 | 1/2003 | Maggi | |
| 2003/0034387 A1 | 2/2003 | Knowles et al. | |
| 2004/0085470 A1 | 5/2004 | Miyashita | |
| 2005/0002715 A1 | 1/2005 | Fries et al. | |
| 2008/0040277 A1 | 2/2008 | DeWitt | |
| 2008/0082426 A1 | 4/2008 | Gokturk et al. | |
| 2008/0130998 A1 | 6/2008 | Maidment et al. | |
| 2008/0177640 A1 | 7/2008 | Gokturk et al. | |
| 2009/0265251 A1 | 10/2009 | Dunlap et al. | |
| 2009/0319388 A1 | 12/2009 | Yuan et al. | |
| 2010/0156919 A1 | 6/2010 | Bala et al. | |

(Continued)

OTHER PUBLICATIONS

Nine Sigma Request for Proposal #67653, "Optical Object Recognition and Feature Mapping by Mobile Devices", 2011, 2 pp.

*Primary Examiner* — Shefali Goradia
(74) *Attorney, Agent, or Firm* — Fox Rothschild LLP

(57) ABSTRACT

A method of estimating one or more dimensions of a patch panel may include receiving an image of a patch panel that comprises a plurality of ports and one or more gaps, extracting, by a computing device, a region of interest from the received image, detecting, by the computing device, one or more line segments from the region of interest, determining whether one or more candidate ports can be identified based on at least a portion of the line segments, and in response to determining that one or more candidate ports can be identified, identifying one or more candidate ports, and determining, by the computing device, a gap length associated with the identified candidate ports.

25 Claims, 7 Drawing Sheets

(56) References Cited

U.S. PATENT DOCUMENTS

| | | |
|---|---|---|
| 2010/0250588 A1 | 9/2010 | Kita |
| 2010/0329547 A1 | 12/2010 | Cavet |
| 2011/0025873 A1 | 2/2011 | Wang et al. |
| 2011/0096142 A1 | 4/2011 | Kiyoshige |
| 2011/0234834 A1 | 9/2011 | Sugimoto |
| 2011/0298204 A1 | 12/2011 | Eschbach |
| 2012/0039514 A1 | 2/2012 | Sun et al. |
| 2012/0189190 A1 | 7/2012 | Bala et al. |
| 2013/0035081 A1 | 2/2013 | Sanger |
| 2013/0094715 A1 | 4/2013 | Benkley et al. |
| 2013/0127822 A1 | 5/2013 | Chen et al. |
| 2013/0183022 A1 | 7/2013 | Suzuki et al. |
| 2013/0198186 A1 | 8/2013 | Parakhin et al. |
| 2013/0293734 A1 | 11/2013 | Fan et al. |

\* cited by examiner

METHODS AND SYSTEMS FOR DETECTING PATCH PANEL PORTS FROM AN IMAGE IN WHICH SOME PORTS ARE OBSCURED

CROSS-REFERENCE TO RELATED APPLICATIONS

This application is related to U.S. patent application Ser. No. 13/967,978, filed on Aug. 15, 2013.

BACKGROUND

Patch panels are commonly used in data centers to connect servers and remote clients. Due to the complexity of these data connections, there can be many cable connectors originating from a single patch panel. A data center can include tens or even hundreds of patch panels.

Labeling ports of a panel requires obtaining the number of ports, accurate sizes of the ports and inter-port distances. A traditional way to generate labels for a patch panel is to use a measuring tape to take measurements, and input the measurements into a label printer. However, this process can be tedious and inefficient. A camera-equipped electronic device, such as a smartphone, may be used to take an image of the to-be-labeled ports and estimate the dimensions of the ports. However, it may be difficult to estimate port dimensions from an image when portions or entire ports are obstructed by cables, wires or other port connections.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimension recited below. As used herein, the term "comprising" means "including, but not limited to."

In an embodiment, a method of estimating one or more dimensions of a patch panel may include receiving an image of a patch panel that comprises a plurality of ports and one or more gaps, extracting, by a computing device, a region of interest from the received image, detecting, by the computing device, one or more line segments from the region of interest, determining whether one or more candidate ports can be identified based on at least a portion of the line segments, and in response to determining that one or more candidate ports can be identified, identifying one or more candidate ports, and determining, by the computing device, a gap length associated with the identified candidate ports.

In an embodiment, a method of estimating one or more dimensions of a patch panel may include receiving an image of a patch panel that comprises a plurality of ports and one or more gaps, extracting, by a computing device, a region of interest from the received image, detecting, by the computing device, one or more line segments from the region of interest, determining whether one or more candidate ports can be identified based on at least a portion of the line segments, and in response to determining that one or more candidate ports cannot be identified, identifying a plurality of candidate port corners, identifying, from the plurality of candidate port corners, a first pair of candidate port corners and a second pair of candidate port corners, and estimating, by the computing device, a gap length between the first pair of candidate port corners and the second pair of candidate port corners.

In an embodiment, a system of estimating one or more dimensions of a patch panel may include a computing device and a computer-readable storage medium in communication with the computing device. The computer-readable storage medium may include one or more programming instructions that, when executed, cause the computing device to receive an image of a patch panel that comprises a plurality of ports and one or more gaps, extract a region of interest from the received image, detect one or more line segments from the region of interest, determine whether one or more candidate ports can be identified based on at least a portion of the line segments, and in response to determining that one or more candidate ports can be identified, identify one or more candidate ports, and determine a gap length associated with the identified candidate ports.

DETAILED DESCRIPTION

The following terms shall have, for purposes of this application, the respective meanings set forth below:

A "cable" refers to a cord, wire, connector, plug and/or the like that is used to connect two or more devices. A cable may be one or more wires surrounded, at least in part, by a covering. Example cables may include, without limitation, a data cable, a power cable and/or the like.

A "gap" refers to an area between a leading edge of one port and a trailing edge of an adjacent port.

A "leading edge" may refer to a vertical port edge located on the right side of a port.

A "patch panel" refers to a box in or associated with an electronic device that includes one or more ports. A patch panel may be used to connect two or more electronic or other devices via one or more wires or other connectors. For example, in a data center, a patch panel may be used to facilitate the connection a client and a server. As another example, in a recording studio, a patch panel may facilitate the connection of electronic instruments, microphones, recording devices, amplifiers and/or the like.

A "port" refers to an electric socket of a patch panel that is configured to receive a wire or other connection.

A "port edge" refers to an edge of a port.

A "trailing edge" refers to a vertical port edge located on the left side of a port.

Figure 1:
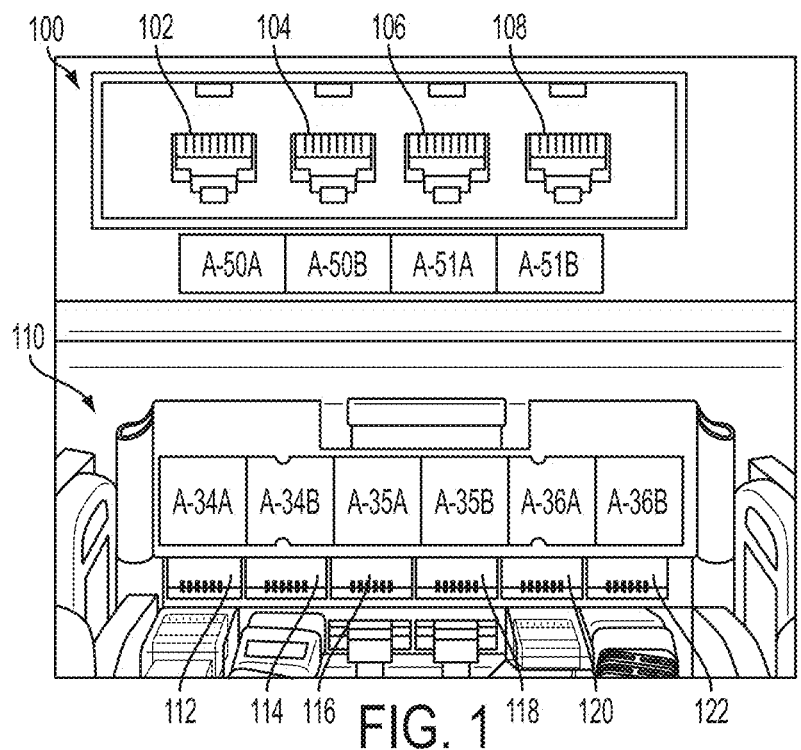
FIG. 1 shows an example patch panel according to an embodiment.

FIG. 1 illustrates an example patch panel of an electronic device according to an embodiment. Examples of electronic devices include, without limitation, personal computers, servers, mainframes, gaming systems, televisions, and portable electronic devices such as smartphones, personal digital assistants, cameras, tablet computers, laptop computers, media players, and/or the like. Other example electronic devices may include, without limitation, routers, switches, media hubs, and other networking devices, microphones, amplifiers and/or the like.

As illustrated by FIG. 1, ports of a patch panel may be divided into one or more groups of ports. Each group may contain one or more ports. For example, as illustrated by FIG. 1, a top patch panel 100 may include four ports 102, 104, 106, 108, and a bottom patch panel 110 may include six ports 112, 114, 116, 118, 120, 122. Additional and/or alternate numbers of groups and/or ports may be used within the scope of this disclosure.

As illustrated by FIG. 1, the inter-port distances of the ports on the top patch panel 100 differ from that of the ports on the bottom patch panel 110. As such, the resulting label strips illustrated in FIG. 1 differ for each patch panel.

Figure 2:
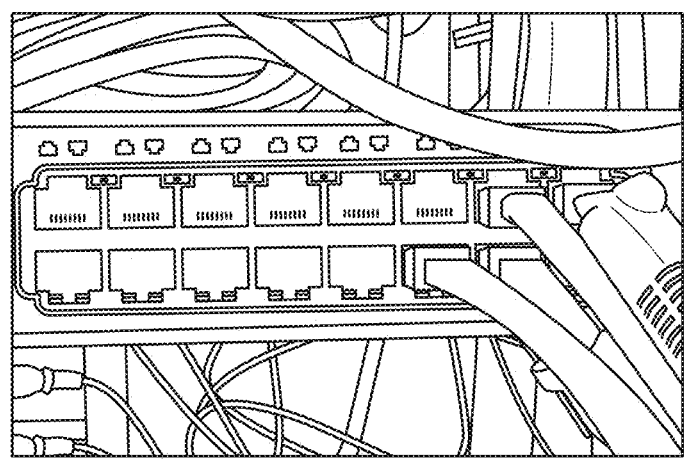
FIG. 2 illustrates an example patch panel having certain cables connected to it according to an embodiment.

FIG. 2 illustrates an example patch panel having certain cables connected to it according to an embodiment. As illustrated by FIG. 2, certain ports of the patch panel are at least partially obstructed by the cables.

Figure 3:
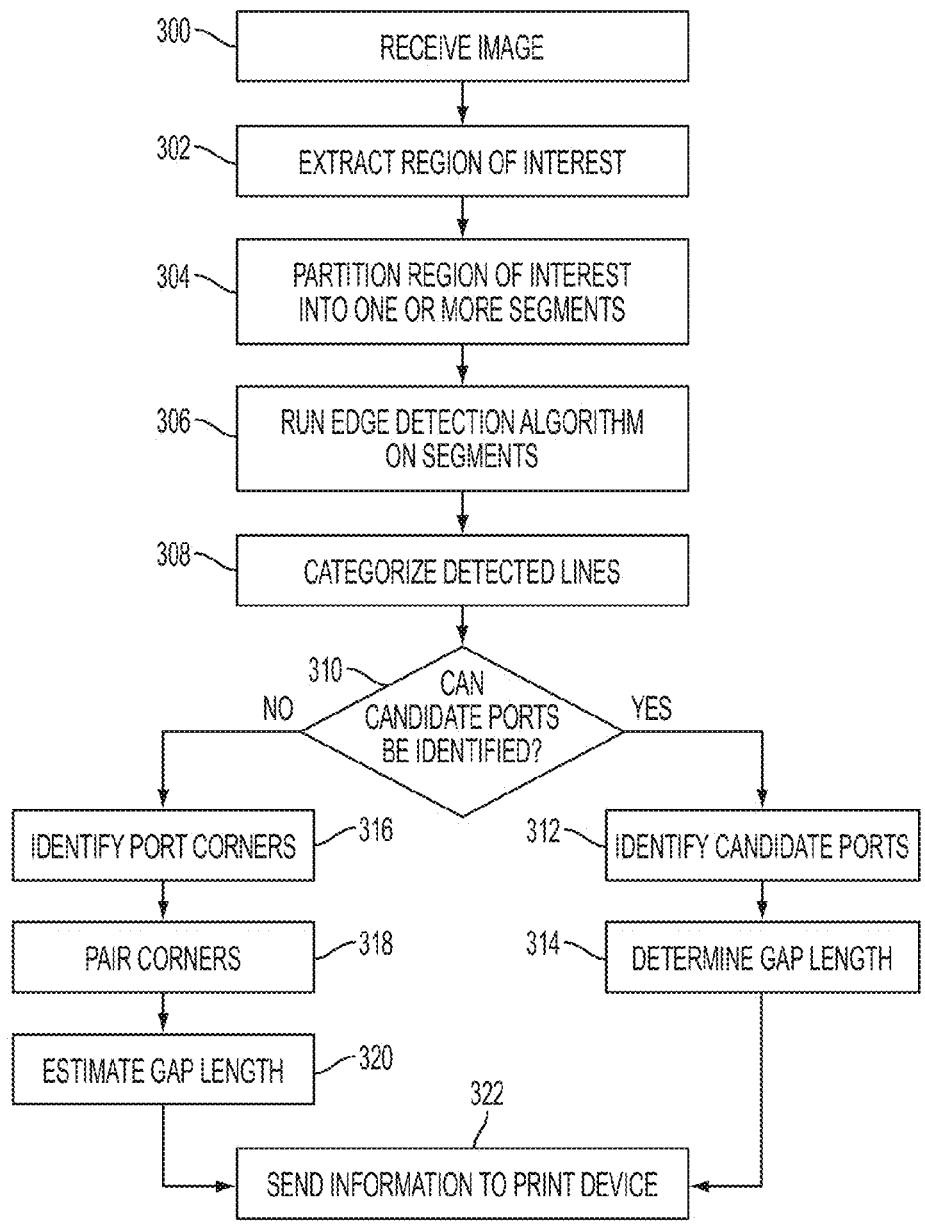
FIG. 3 illustrates a flow chart of an example method of estimating patch panel measurements according to an embodiment.

FIG. 3 illustrates a flow chart of an example method of estimating patch panel measurements according to an embodiment. As illustrated by FIG. 3, an image of one or more patch panels may be received 300. In an embodiment, an image may be a picture of a patch panel that may be captured by an imaging device. An imaging device may be a computing device configured to capture one or more images and may include, without limitation, a camera, a mobile device, a tablet, a smartphone and/or the like. In an embodiment, an image may be received from an imaging device.

In an embodiment, one or more markers may be used during the image capture process. A marker may be an electronic object that may be used to assist with alignment, position, location and/or the like of an image. In an embodiment, one or more markers may be displayed in a user interface of an imaging device. One or more markers may be provided in a user interface to allow users to align at least a portion of the image, reduce distortion of the image or change the perspective or view of an image. In an embodiment, a marker may be overlaid on a frame or screen, such as a preview screen, of an imaging device.

Figure 4:
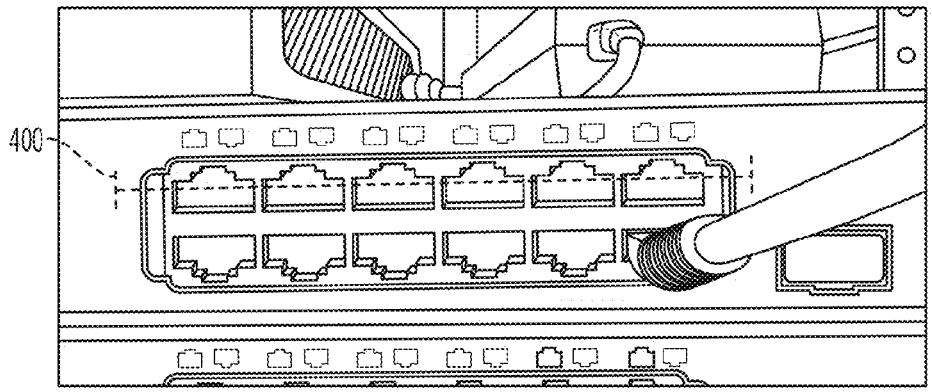
FIGS. 4-6 illustrate example markers according to various embodiments.
Figure 5:
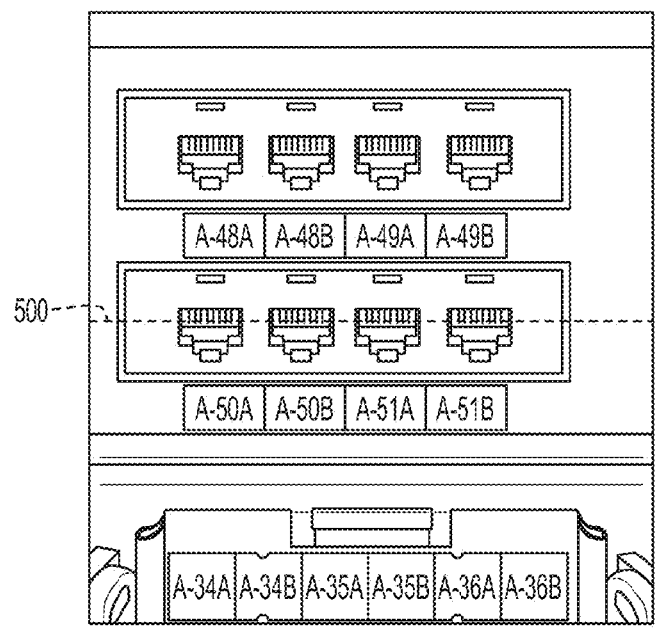
Figure 6:
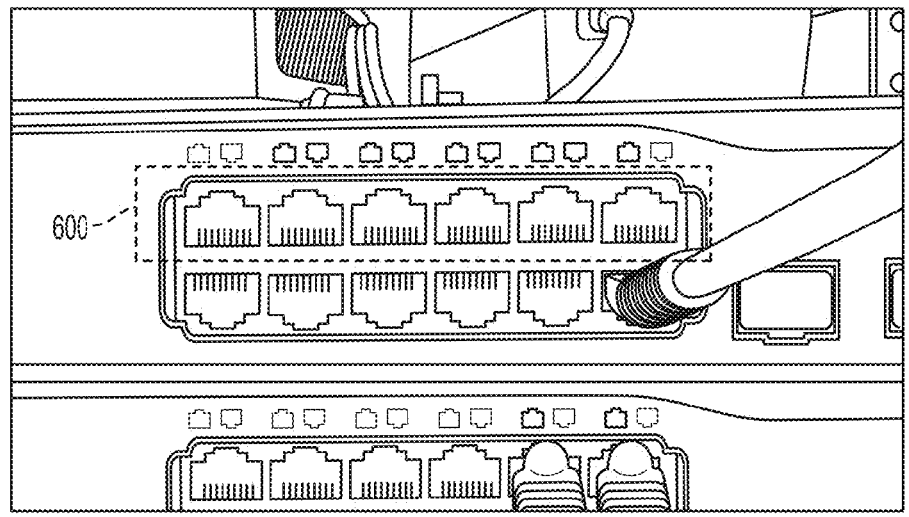

FIGS. 4-6 illustrate example markers according to various embodiments. FIG. 4 illustrates a marker 400 shown as a horizontal straight line segment with starting and ending points 402, 403 that are shown as two vertical lines. A user may be able to align the marker with one or more ports or patch panels by moving the marker, a start point of a marker, an end point of a marker, and/or the like. As such, a marker may be used to identify one or more ports or patch panels to be analyzed. FIG. 5 illustrates an example marker 500 depicted as a horizontal line. FIG. 6 illustrates an example marker 600 depicted as a rectangular box. In an embodiment, the size and/or aspect ratio of the box may be adjusted by a user. For example, a user may edit the box using a user interface of an imaging device. Additional and/or alternate shaped and/or sized markers may be used within the scope of this disclosure.

Referring back to FIG. 3, in an embodiment, a region of interest may be extracted 302 from the captured image. A region of interest may be extracted 302 based on the location of one or more markers. For example, a width, a height or another dimension with respect to a marker may be extracted as a region of interest. For instance, an extracted region of interest may include a portion of an image that includes a quarter of an inch from a marker in all directions. Additional and/or alternate areas may be used within the scope of this disclosure.

Figure 7:
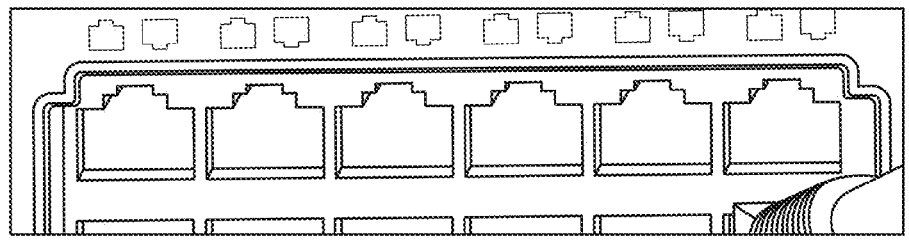
FIG. 7 illustrates an example region of interest extracted from an image according to an embodiment.

FIG. 7 illustrates an example region of interest extracted from the image shown in FIG. 4. As illustrated by FIG. 7, the extracted region of interest includes the patch panel corresponding to the marker 400 in FIG. 4.

Figure 8:
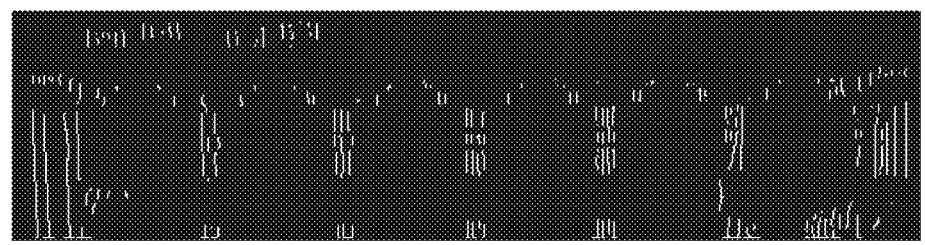
FIG. 8 illustrates an example image showing line segments that are detected using an edge detection algorithm according to an embodiment.
Figure 10:
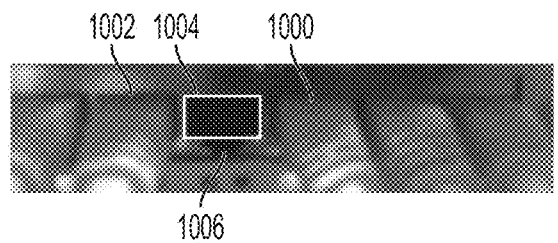
FIG. 10 illustrates an example image of a port according to an embodiment.

Referring back to FIG. 3, in an embodiment, the extracted region of interest may be partitioned 304 into one or more segments. An edge detection algorithm may be run 306 for one or more of the segments. In an embodiment, an edge detection algorithm may locate one or more lines or line segments from an image. Example edge detection algorithms may include, without limitation, a Canny edge detection algorithm. In an embodiment, one or more of the detected lines or line segments may be categorized 308 into a trailing edge, a leading edge, an upper edge or a lower edge of a port. FIG. 8 illustrates an example image showing line segments that are detected using an edge detection algorithm according to an embodiment. In an embodiment, the detected line segments may be displayed so that their associated category may be ascertained. For example, leading edges may be displayed in red, trailing edges may be displayed in blue, upper edges may be displayed in yellow, and lower edges may be displayed in green. FIG. 10 illustrates an example image of a port showing detected line segments categorized as a leading edge 1000, a trailing edge 1002, an upper edge 1004 and a lower edge 1006 according to an embodiment. Additional and/or alternate display techniques may be used within the scope of this disclosure.

Referring back to FIG. 3, in an embodiment, it may be determined 310 whether one or more candidate ports may be identified based on at least a portion of the detected line segments. If it is determined that one or more candidate ports may be identified, then one or more candidate ports may be identified 312 based on at least a portion of the detected line segments. One or more candidate ports may be identified 312 using template matching. For example, a template having a dark interior portion surrounded by a lighter border along three edges may be used to identify 312 a candidate port. In an embodiment, a template having a dark interior portion surrounded by a lighter border along a trailing edge, an upper edge and a leading edge may be used to identify 312 a candidate upper port. In an embodiment, a template having a dark interior portion surrounded by a lighter border along a trailing edge, a lower edge and a leading edge may be used to identify 312 a candidate lower port.

In an embodiment, a gap length may be determined 314 for one or more identified candidate ports. If two or more candidate ports are identified, the system may determine whether another port may fit between any pair of candidate ports. For example, it may be assumed that a gap length, at most, is half of the port length of a candidate port and that candidate ports have equal port lengths. If the distance between two ports does not exceed half of the port length, then it may be determined that another port may not fit between a pair of candidate ports. In response to determining that no port can fit between a pair of candidate ports, then the gap length may be estimated as the distance between the leading edge of one port and the trailing edge of the other port.

In an embodiment, if it is determined that one or more ports may fit between a pair of candidate ports, a periodicity may be determined for the portion of the image between the pair of candidate ports. In an embodiment, a periodicity may be determined using a Fourier method. The periodicity may then be used to estimate a gap length between one or more pairs of candidate ports.

In an embodiment, a periodicity may be determined using an autocorrelation of the pixel values in the horizontal direction and finding the first maximum value that occurs after the center point of the autocorrelation. The periodicity may indicate the number of ports in between the two detected ports, and this information may be used to estimate the gap length.

In an embodiment, if only one candidate port is identified, then a periodicity may be determined for the portion of the image surrounding the identified candidate port. In an embodiment, a periodicity may be determined using a Fourier method.

Figure 11:
FIG. 11 illustrates an example image of a port according to an embodiment.

In an embodiment, if it is determined 310 that one or more candidate ports may not be identified, then one or more port corners may be identified 316. In an embodiment, a port corner may be identified 316 using a corner detection algorithm. A corner detection algorithm may be applied to one or more detected line segments. In an embodiment, one or more candidate ports may not be able to be identified if the ports are obstructed, at least in part, by one or more cables. For example, as illustrated by FIG. 11, one or more port corners may be visible even if a port is obstructed by one or more cables.

In an embodiment, example corner detection algorithms may include, without limitation, a Harris corner detection algorithm, the Forstner corner detection algorithm and/or the like. A corner detection algorithm may analyze detected line segments to determine which, if any, of the line segments may represent one or more port corners.

In an embodiment, one or more detected corners may be paired 318 according to their orientations and/or relative locations. For example, a northeast corner at left and a northwest corner at right may be paired if they share a similar vertical position and the horizontal distance between the corners does not exceed a certain threshold value.

In an embodiment, a gap length, in pixels, may be estimated 320. A gap length may be estimated 320 using the horizontal distance between two paired corners. If two or more corner pairs at neighboring horizontal locations are detected, then the horizontal port periodicity may be determined. A horizontal port periodicity may represent the sum of the port length and a gap length. As such, the gap length may be estimated based on the determined horizontal port periodicity value.

If two or more corner pairs at neighboring horizontal locations are not detected, then horizontal port periodicity may be estimated by a Fourier method. The estimated gap length may be represented by the difference between the horizontal periodicity and the port length.

In an embodiment, a position of one or more ports of the patch panel may be estimated. For example, a position of one or more ports of the patch panel may be estimated based on the estimated gap length.

In an embodiment, information relating to the location of one or more detected ports may be provided 322 to a print device. For example, information relating to a port length, a horizontal periodicity, a gap length and/or the like may be provided to a print device. The print device may use this information to generate one or more labels that correspond to the patch panel illustrated in the received image. In an embodiment, the position of one or more labels may align with the locations of one or more ports of the patch panel. For example, a print device may generate a sheet of labels where the position and dimensions of each label align with the position and dimensions of a port of a port panel.

Figure 9:
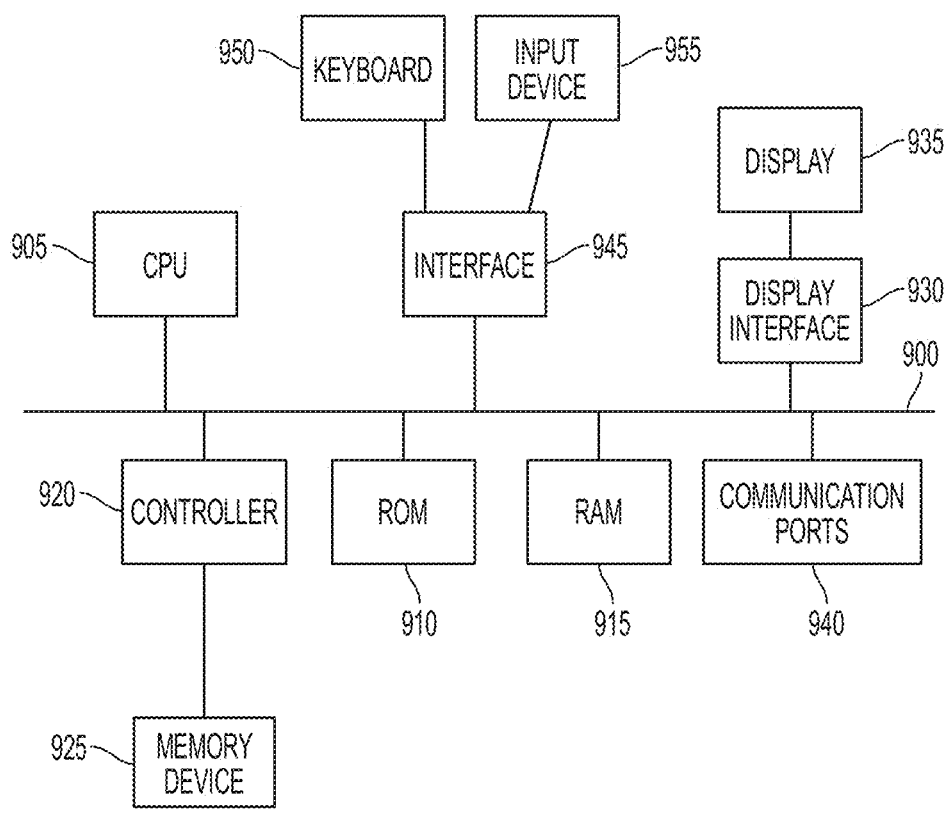
FIG. 9 illustrates a block diagram of example hardware that may be used to contain or implement program instructions according to an embodiment.

FIG. 9 depicts a block diagram of hardware that may be used to contain or implement program instructions. A bus 900 serves as the main information highway interconnecting the other illustrated components of the hardware. CPU 905 is the central processing unit of the system, performing calculations and logic operations required to execute a program. CPU 905, alone or in conjunction with one or more of the other elements disclosed in FIG. 9, is an example of a production device, computing device or processor as such terms are used within this disclosure. Read only memory (ROM) 910 and random access memory (RAM) 915 constitute examples of non-transitory computer-readable storage media.

A controller 920 interfaces with one or more optional non-transitory computer-readable storage media 925 to the system bus 900. These storage media 925 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 910 and/or the RAM 915. Optionally, the program instructions may be stored on a tangible non-transitory computer-readable medium such as a compact disk, a digital disk, flash memory, a memory card, a USB drive, an optical disc storage medium, such as a Blu-Ray™ disc, and/or other recording medium.

An optional display interface 930 may permit information from the bus 900 to be displayed on the display 935 in audio, visual, graphic or alphanumeric format. Communication with external devices, such as a printing device, may occur using various communication ports 940. A communication port 940 may be attached to a communications network, such as the Internet or an intranet.

The hardware may also include an interface 945 which allows for receipt of data from input devices such as a keyboard 950 or other input device 955 such as a mouse, a joystick, a touch screen, a remote control, a pointing device, a video input device and/or an audio input device.

It will be appreciated that various of the above-disclosed and other features and functions, or alternatives thereof, may be desirably combined into many other different systems or applications or combinations of systems and applications. Also that various presently unforeseen or unanticipated alternatives, modifications, variations or improvements therein may be subsequently made by those skilled in the art which are also intended to be encompassed by the following claims.

What is claimed is:

1. A method of estimating one or more dimensions of a patch panel, the method comprising:
   receiving an image of a patch panel, wherein the patch panel comprises a plurality of ports and one or more gaps;
   extracting, by a computing device, a region of interest from the received image;
   detecting, by the computing device, one or more line segments from the region of interest;

determining whether one or more candidate ports can be identified based on at least a portion of the line segments; and in response to determining that one or more candidate ports can be identified:
  identifying one or more candidate ports, and
  determining, by the computing device, a gap length associated with the identified candidate ports.

2. The method of claim 1, wherein:
receiving an image of a patch panel comprises receiving the image of the patch panel from an imaging device, wherein the image comprises one or more images of one or more ports at least partially obfuscated by one or more cables.

3. The method of claim 2, further comprising:
presenting, by the imaging device, one or more markers on a user interface to assist with alignment of the image.

4. The method of claim 3, wherein:
receiving an image of a patch panel further comprises receiving an indication of the one or more markers;
extracting a region of interest from the received image comprises extracting the region of interest based on the received indication.

5. The method of claim 1, wherein detecting one or more line segments from the region of interest comprises:
  applying an edge detection algorithm to the received image to identify the one or more line segments;
  categorizing the identified line segments as one of the following:
    a leading edge,
    a trailing edge,
    an upper edge, and
    a lower edge.

6. The method of claim 1, wherein determining whether one or more candidate ports can be identified based on at least a portion of the line segments comprises comparing at least a portion of the line segments to a template illustrating one or more ports.

7. The method of claim 1, wherein determining a gap length associated with the identified candidate ports comprises, in response to determining that only one candidate port is identified:
  determining a periodicity associated with an area surrounding the candidate port in the image, and
  estimating the gap length based on the periodicity.

8. The method of claim 1, wherein determining a gap length associated with the identified candidate ports comprises, in response to determining that two candidate ports are identified:
  determining whether a port can fit between the two candidate ports;
  in response to determining that a port can fit between the two candidate ports;
  determining a periodicity associated with an area surrounding between the two candidate ports in the image; and
  estimating the gap length based on the periodicity.

9. The method of claim 1, wherein determining a gap length associated with the identified candidate ports comprises, in response to determining that two candidate ports are identified:
  determining whether a port can fit between the two candidate ports;
  in response to determining that a port cannot fit between the two candidate ports:
    identifying one of the two candidate ports as a leftmost port and the other candidate port as a rightmost port,
    determining a distance between a leading edge of the leftmost port and a trailing edge of the rightmost port; and
    estimating the gap length to be the determined distance.

10. The method of claim 1, further comprising estimating a position of one or more of the ports of the patch panel based on the determined gap length.

11. The method of claim 1, further comprising providing the determined gap length to a print device.

12. A method of estimating one or more dimensions of a patch panel, the method comprising:
  receiving an image of a patch panel, wherein the patch panel comprises a plurality of ports and one or more gaps;
  extracting, by a computing device, a region of interest from the received image;
  detecting, by the computing device, one or more line segments from the region of interest;
  determining whether one or more candidate ports can be identified based on at least a portion of the line segments; and
  in response to determining that one or more candidate ports cannot be identified:
    identifying a plurality of candidate port corners,
    identifying, from the plurality of candidate port corners, a first pair of candidate port corners and a second pair of candidate port corners, and
    estimating, by the computing device, a gap length between the first pair of candidate port corners and the second pair of candidate port corners.

13. The method of claim 12, wherein identifying a plurality of candidate port corners comprises identifying a plurality of candidate port corners using a port detection algorithm.

14. The method of claim 12, wherein estimating a gap length between the first pair of candidate port corners and the second pair of candidate port corners comprises:
  determining whether the first pair of candidate port corners and the second pair of candidate port corners are positioned at neighboring horizontal locations;
  in response to determining that the first pair of candidate port corners and the second pair of candidate port corners are positioned at neighboring horizontal locations, determining a horizontal periodicity between the first pair of candidate port corners and the second pair of candidate ports; and
  estimating the gap length based on the horizontal periodicity.

15. The method of claim 12, wherein estimating a gap length between the first pair of candidate port corners and the second pair of candidate port corners comprises:
  determining whether the first pair of candidate port corners and the second pair of candidate port corners are positioned at neighboring horizontal locations;
  in response to determining that the first pair of candidate port corners and the second pair of candidate port corners are positioned at neighboring horizontal locations, estimating a horizontal periodicity using a Fournier method;
  estimating the gap length based on the estimated horizontal periodicity.

16. The method of claim 12, wherein receiving an image of a patch panel comprises receiving the image of the patch panel from an imaging device, wherein the image comprises one or more images of one or more ports at least partially obfuscated by one or more cables.

17. The method of claim 12, further comprising estimating a position of one or more of the ports of the patch panel based on the determined gap length.

18. The method of claim 12, further comprising providing the estimated gap length to a print device.

19. A system of estimating one or more dimensions of a patch panel, the system comprising:
   a computing device; and
   a computer-readable storage medium in communication with the computing device, wherein the computer-readable storage medium comprises one or more programming instructions that, when executed, cause the computing device to:
      receive an image of a patch panel, wherein the patch panel comprises a plurality of ports and one or more gaps,
      extract a region of interest from the received image,
      detect one or more line segments from the region of interest,
      determine whether one or more candidate ports can be identified based on at least a portion of the line segments, and
      in response to determining that one or more candidate ports can be identified:
         identify one or more candidate ports, and
         determine a gap length associated with the identified candidate ports.

20. The system of claim 19, wherein the one or more programming instructions that, when executed, cause the computing device to receive an image of a patch panel comprise one or more programming instructions that, when executed, cause the computing device to receive the image of the patch panel from an imaging device, wherein the image comprises one or more images of one or more ports at least partially obfuscated by one or more cables.

21. The system of claim 19, wherein the one or more programming instructions that, when executed, cause the computing device to detect one or more line segments from the region of interest comprise one or more programming instructions that, when executed, cause the computing device to:
   apply an edge detection algorithm to the received image to identify the one or more line segments;
   categorize the identified line segments as one of the following:
      a leading edge,
      a trailing edge,
      an upper edge, and
      a lower edge.

22. The system of claim 19, wherein the one or more programming instructions that, when executed, cause the computing device to determine whether one or more candidate ports can be identified based on at least a portion of the line segments comprise one or more programming instructions that, when executed, cause the computing device to compare at least a portion of the line segments to a template illustrating one or more ports.

23. The system of claim 19, wherein the one or more programming instructions that, when executed, cause the computing device to determine a gap length associated with the identified candidate ports comprise one or more programming instructions that, when executed, cause the computing device to, in response to determining that only one candidate port is identified:
   determine a periodicity associated with an area surrounding the candidate port in the image, and
   estimate the gap length based on the periodicity.

24. The system of claim 19, wherein one or more programming instructions that, when executed, cause the computing device to determine a gap length associated with the identified candidate ports comprise one or more programming instructions that, when executed, cause the computing device to, in response to determining that two candidate ports are identified:
   determine whether a port can fit between the two candidate ports;
   in response to determining that a port can fit between the two candidate ports; determine a periodicity associated with an area surrounding between the two candidate ports in the image; and
   estimate the gap length based on the periodicity.

25. The system of claim 19, wherein the one or more programming instructions that, when executed, cause the computing device to determine a gap length associated with the identified candidate ports comprise one or more programming instructions that, when executed, cause the computing device to, in response to determining that two candidate ports are identified:
   determine whether a port can fit between the two candidate ports;
   in response to determining that a port cannot fit between the two candidate ports:
      identify one of the two candidate ports as a leftmost port and the other candidate port as a rightmost port,
      determine a distance between a leading edge of the leftmost port and a trailing edge of the rightmost port; and
      estimate the gap length to be the determined distance.

* * * * *